United States Patent [19]

Pasqualucci et al.

[11] 3,872,088

[45] Mar. 18, 1975

[54] METHOD FOR THE PRODUCTION OF D(-)-α-AMINOBENZYLPENICILLIN DIRECTLY FROM NATURAL PENICILLINS

[75] Inventors: Carmine Renato Pasqualucci, Milan; Giovanni Bonfanti, Sassari; Sesto San Giovanni, Sassari; Giorgio Cignarella, Sassari, all of Italy

[73] Assignee: Archifar Industrie Chimiche del Trentino S.p.A., Rovereto (Irento), Italy

[22] Filed: June 12, 1972

[21] Appl. No.: 262,123

[30] Foreign Application Priority Data
June 25, 1971 Italy .............................. 26279/71

[52] U.S. Cl. .............................. 260/239.1, 424/271
[51] Int. Cl. ............................... C07d 99/16

[58] Field of Search ................................. 260/239.1

[56] References Cited
UNITED STATES PATENTS

| | | | |
|---|---|---|---|
| 3,499,909 | 3/1970 | Weisenburger et al. | 260/243 C |
| 3,663,563 | 5/1972 | Fosker et al. | 260/239.1 |

*Primary Examiner*—Nicholas S. Rizzo

[57] ABSTRACT

A method for preparing D(-)-α-amino-benzylpenicillin directly from natural penicillins by an one-stage process. The natural penicillins are esterified, transformed into iminochloride and then into iminoethers which is reacted simultaneously with water and chloride of phenylglycine hydrochloride to give the desired product.

3 Claims, No Drawings

METHOD FOR THE PRODUCTION OF D(-)-α-AMINOBENZYLPENICILLIN DIRECTLY FROM NATURAL PENICILLINS

This invention relates to a method for preparing D (−)- α-amino-benzylpenicillin (I)

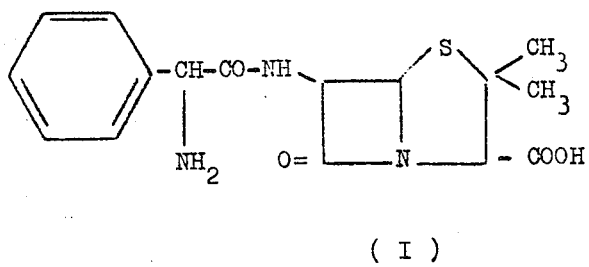

(I)

directly from natural penicillins as benzylpenicillin or phenoxymethylpenicillin by a single-stage process.

The wide applications of (I) as antibiotic in human therapy are well known. The industrial methods for the preparation of (I) generally require acylation, by active derivatives of D (−)-α-phenylglycine, of 6-aminopenicillanic acid which, in turn, can be obtained by chemical or microbiological de-acetylation of the above mentioned natural penicillins.

The object of the present invention is to provide a method for the production of D (−)-α-aminobenzylpenicillin from natural penicillins by a direct process not involving isolation of intermediates.

A further object of the present invention is to provide a method for preparing (I) easy to be accomplished, of rapid execution, which requires a very simple equipment and which furnishes a high conversion yield.

Still another object is to have a process which can be carried out also in a single solvent, namely acetone, thus providing a further simplification.

These and further objects are accomplished by the present invention by transforming an ester of a natural penicillin into an imidate, which by addition of the chloride of D(−) phenylglycine hydrochloride in the presence of water at low temperatures followed by removing of the carboxy-protecting group, leads to the desired D(−)-α-amino-benzylpenicillin in high yield.

According to this process, a natural penicillin, specifically benzylpenicillin or phenoxymethylpenicillin, is esterified preferably with trimethyl silyl chloride or dimethyldichlorosilane in the presence of a tertiary base, preferably quinoline or dimethyl aniline in order to obtain an ester which can be easily hydrolized also at room temperature.

This ester is then transformed into the imidate (II) according to a well known reaction of amides (R. Roger - D. G. Neilson - The Chemistry of Imidates in Chemical Reviews - 61, 179, 1961), by adding to the ester solution at temperatures from + 10° C to − 50° C first a chlorinating agent, preferably $PCl_5$ in equimolar amount to form an imino chloride, then a lower primary alcohol, preferably butanol.

This reaction is carried out in an organic solvent, preferably acetone or chlorinated solvents or a mixture of the mentioned solvents.

Then to the solution containing the imidate (II) at temperatures ranging from −50° C to −10° C are added water and the chloride of D(−)-α-phenylglycine hydrochloride (III) to obtain the ester of the penicillin (I) according to the following scheme:

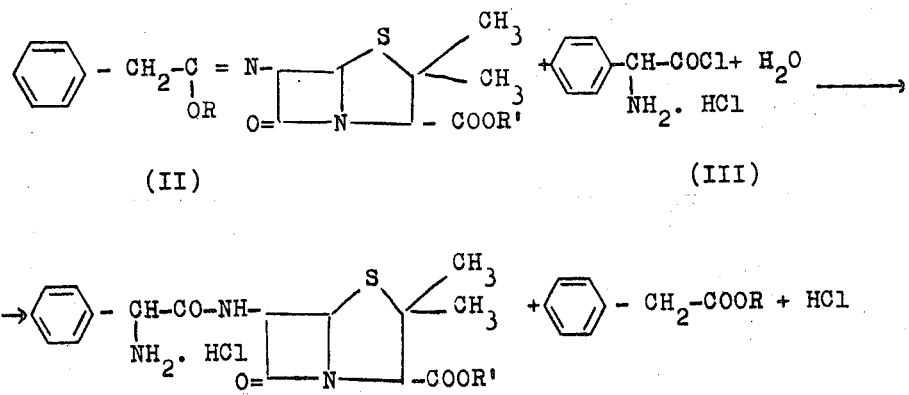

wherein
R = $CH_3$; $C_2H_5$; $C_3H_7$; $C_4H_9$
R' = $Si(CH_3)_3$; $Si(CH_3)_2Cl$ This reaction is usually carried out at temperatures ranging from −50° C to −10° C in order to minimize the hydrolysis of the acid chloride (III) which can therefore react with the intermediate (A) resulting from the addition of water to imidate (ref. cited).

It will be clear to those skilled in art that the synthesis of the penicillin (I) from the imidate (II) does not necessarily involve 6-aminopenicillanic acid as intermediate, because the formation of (I) can be correctly interpreted by a concerted mechanism between (A) and (III) as shown in the following scheme:

(III)

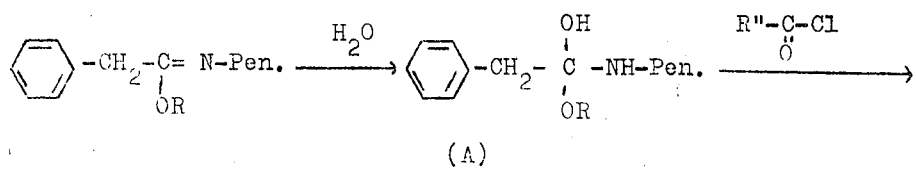

(A)

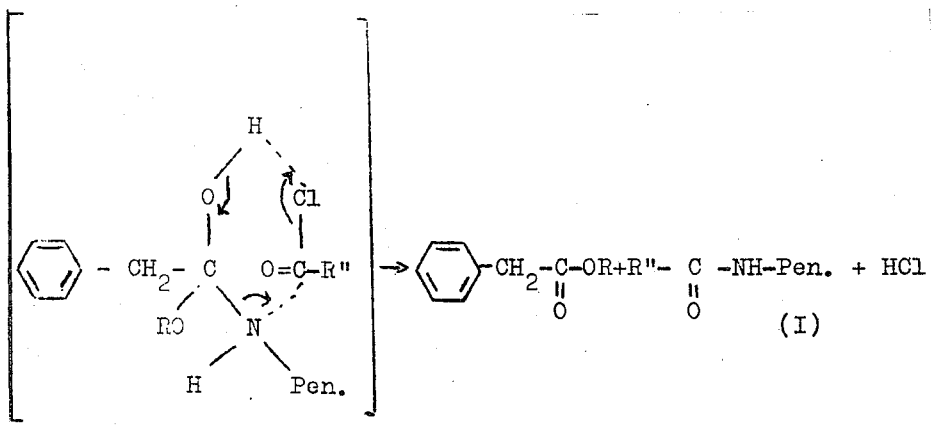

wherein

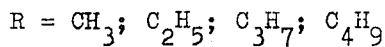

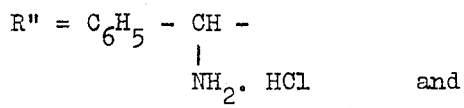

and

Pen. is

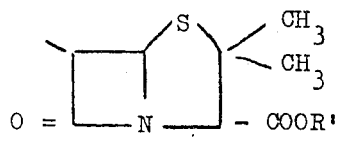

In order to isolate D(—)-α-amino benzylpenicillin (I) the carboxy-protecting group is removed by adding excess water to the mixture and raising the temperature to room temperature.

After extraction of the mixture with chloroform, the pH of the aqueous layer is adjusted to 4 - 5 to precipitate D(—)-α-aminobenzylpenicillin as trihydrate.

This process has been succesfully applied directly to the organic extract of fermentation broth of penicillins; in this case the isolation of the natural penicillin is overcome.

In order to make the features of the present invention clear, some non limitative examples will now be given:

EXAMPLE N. 1

75 g of benzylpenicillin potassium salt are suspended in 800 ml of acetone at room temperature. 100 g of quinoline technical grade and 44 g of dimethyldichlorosilane are added. After standing one hour under stirring at room temperature the solution is cooled to —30° C; then 42.5 g of $PCl_5$ are added.

After reaction time of 120 minutes, 16 g of butyl alcohol are added and then the solution is kept to reacting for 4 hours at —20° C. 40 ml of acetone containing 10 percent by volume of water and 45.4 g of chloride of phenylglycine hydrochloride are simultaneously added under strong agitation maintaining then the suspension at —20° C for one hour.

The suspension is filtered to eliminate the impurities. 400 ml of deionized water and 1000 ml of chloroform are added.

After stirring for 10 minutes the mixture is allowed to separate; the organic layer is discarded and then the aqueous layer is twice washed with chloroform. The aqueous solution is then treated with charcoal, filtered and the pH is brought to 5 with NaOH 10 percent. After stirring for one hour the crystallized D(—)-α-aminobenzylpenicillin trihydrate is filtered washed and dried. 63 g of product are obtained (74.9 percent) having the following analytical data:
- Spectrophotometric assay on the anhydrous basis = 97.5 percent
- Specific rotation = + 290
- Water (K. Fischer) = 13.8 percent

EXAMPLE N. 2

The starting material is fermentation broth obtained from a mutant culture of penicillin chrysogenum.

The fermentation medium having the following composition (gr./liter):

| | | |
|---|---|---|
| Peanut meal | 20.0 | |
| Corn steep liquor | 5.0 | (50% solids) |
| Lactose | 40.0 | |
| $Na_2SO_4$ anhydrous | 1.0 | |
| $CaCO_3$ | 5.0 | |
| $H_3PO_4$ | 0.132 | |
| Phenylacetic acid | 4.0 | |
| Corn oil | 1.0 | |
| Tap water up to | 1000 ml. | | is inoculated and then incubated for 140 hours at 25° C. After 66 and 90 hours of incubation sterile phenylacetic acid is added.

Under these conditions at harvest the fermentation broth has a potency of about 8 mg/ml as benzyl penicillin.

The broth is filtered on celite, then acidified until pH 2 and extracted with chloroform.

In order to eliminate some impurities, the benzyl penicillin is extracted from chloroform with water buffered at pH 7 and then riextracted with fresh chloroform after acidification of aqueous solution.

The organic layer is washed with water, dried with sodium sulphate and after filtration evaporated under vacuum until to have a solution with a concentration of about 10 percent as benzyl penicillin.

To 800 ml of this solution 130 g of quinoline and 40 g of dimethyldichlorosilane are added. After stirring for 1 hour at room temperature the solution is cooled to −30° C.

42.5 g of PCl$_5$ are added and the solution is kept under stirring for three hours at −30° C.

800 ml of acetone cooled to −30° C and containing 16 g of butyl alcohol are added and after stirring for 6 hours at −30° C 40 ml of acetone containing 10 percent of water and 50 g of chloride of phenylglycine hydrochloride are simultaneously added. The temperature raises to −15° C, the solution is kept under stirring for one hour maintaining the pH range between 1 and 2 by adding triethylamine. The solution is then filtered, diluted with 500 ml of water; the organic layer is discarded and the aqueous layer washed with additional 500 ml of chloroform. The aqueous phase is brought to pH 4.8 at 0° C. The precipitate is filtered, washed and dried, 68 g of pure D(−)-α-aminobenzylpenicillin are obtained having the following analytical data:
- Spectrophotometric assay on the anhydrous basis = 99.3 percent
- Specific rotation = + 295
- Water (K. Fischer) = 13.4 percent

EXAMPLE N. 3

75 g of benzyl penicillin potassium salt are suspended in 800 ml of methylene chloride freshly distilled, 200 g of quinoline technical grade and 40 g of trimethyl chlorosilane are added. After stirring for 30 min. at room temperature the solution is cooled to −40° C and 45 g of PCl$_5$ are added. After stirring for 2 hours maintaining the temperature below −20° C, 50 g of methylene chloride containing 7 g of methyl alcohol are added. The solution is kept for two hours at about −20° C under stirring, then 400 ml of acetone containing 1 percent of water and 68 g of chloride of D(−)-α-phenylglycine hydrochloride are added. The solution is stirred for 40 minutes at −20° C and then for 20 minutes at −15° C. 600 ml of deionized water are added, the pH is corrected to 1.5 with NaOH 5 percent and the solution is filtered. After separation of two layers, the organic one is discarded; the pH is brought to 7.6 and the aqueous solution is washed with 600 ml of chloroform.

The pH is then corrected to 4.8 with diluted hydrochloric acid. After stirring for 4 hours at 0° C the precipitate of D(−)-α-aminobenzylpenicillin trihydrated is obtained which, after filtration, washing and drying yields 56.2 g of pure product having the following analytical data:
- Spectrophotometric assay on the anhydrous basis = 96.8 percent
- Specific rotation = + 285
- Water (K. Fischer) = 14.3 percent

EXAMPLE N. 4

78 g of phenoxymethylpenicillin potassium salt are suspended in 600 ml of acetone containing 250 g of dimethylaniline; after stirring for 10 minutes 40 g of trimethylchlorosilane are added. The solution is cooled to −40° C and a suspension of 45 g of PCl$_5$ in 200 ml of methylene chloride is slowly added. After stirring for 2 hours maintaining the temperature at about −20° C, 400 ml of chloroform containing 16 g of butyl alcohol are added. The solution is kept under stirring for 3 hours at −20° C. Then 40 ml of acetone containing 10 percent by volume of water is dropwise added and simultaneously also 46 g of chloride of D(−)-α-phenylglycine are added by small portions.

After keeping for 1 hour at −15° C, the suspension is filtered, 500 ml of deionized water are added and the pH is brought to 1.8 by adding sodium hydroxide 3 percent.

After separation of two layers, the organic one is discarded; the aqueous phase is washed at 0° C twice with 300 ml of chloroform, then the pH is brought to 5 with diluted sodium hydroxide.

After keeping for 2 hours at 0° C the product is filtered, washed and dried. 56.3 g of D(−)-α-aminobenzylpenicillin trihydrated of very pure quality are obtained having the following analytical data:
- Spectrophotometric assay on the anhydrous basis = 99.5 percent
- Specific rotation = + 295
- Water (K. Fischer) = 14.2 percent

EXAMPLE N. 5

75 g of benzylpenicillin potassium salt are suspended in 800 ml of chloroform at room temperature. 90 g of quinoline technical grade and 40 g of dimethyldichlorosilane are added. After stirring for 1 hour at room temperature, the solution is cooled to −30° C. Then 42,5 g of PCl$_5$ are added and the solution is maintained at −30° C under stirring for 3 hours. 250 ml of butylalcohol previously cooled at −30° C are added and the solution stirred for 4 hours always at −30° C. The temperature is raised to −25° C and 40 ml of acetone containing 5 ml of water are added. After stirring for 1 hour, simultaneously 500 ml of acetone containing 40 ml of water and 47 g of chloride of phenylglicyne hydrochloride are added portion wise, keeping the pH near 1.8 with NH$_3$ concentrated. After the additions the solution is kept for 1 hour at −25° C. Then the solution is filtered, diluted with 500 ml of water; the organic layer is discarded and the aqueous layer is brought to pH 4,8 at 0° C with diluted ammonia. The precipitate is filtered, washed and dried. 62 g of D(−)-α-aminobenzylpenicillin are obtained (74,4 percent) having the following analitical data;
- spectrophotometric assay on the anhydrous basis = 98.7 percent
- specifica rotation = + 293
- water (K. Fischer) = + 14.2 percent

What we claim is:

1. A method for preparing D(−)-a-aminobenzylpenicillin directly from natural penicillins, comprising the steps of:
   mixing a natural penicillin selected from a group consisting of benzylpenicillin, phenoxymethylpenicillin, and combinations of benzylpenicillin and phenoxymethylpenicillin in a solvent selected from a group consisting of methylene chloride, chloroform, acetone, and combinations of methylene chloride, chloroform and acetone;

adding to the mixture an alkychlorosilane selected from the group consisting of dimethyldichlorosilane and trimethylchlorosilane, and a tertiary base selected from the group consisting of dimethylaniline and quinoline to esterity said natural penicillin;

adding to the mixture containing esterified penicillin phosphorous pentachloride to transform the esterified penicillin into the corresponding iminochloride;

adding to the mixture containing the iminochloride a primary alcohol selected from the group consisting of methyl alcohol and butyl alcohol to transform the iminochloride into an imidate;

adding acetone to the mixture containing the imidate;

reacting the imidate in the mixture at a temperature range from −50°C to −15°C simultaneously with water and acid chloride of phenylglycine hydrochloride at a pH between 1 and 2; and adding a large excess of water to hydrolyze the ester.

2. A method for preparing D(−)-a-aminobenzylpenicillin directly from natural penicillins, comprising the steps of:

mixing a natural penicillin selected from a group consisting of benzylpenicillin, phenoxymethylpenicillin, and combinations of benzylpenicillin and phenomethylpenicillin in a solvent selected from a group consisting of methylene chloride, chloroform, acetone, and combinations of methylene chloride, chloroform, and acetone;

adding to the mixture an alkychlorosilane selected from the group consisting of dimethylchlorosilane and trimethylchlorosilane and a tertiary base selected from the group consisting of dimethylaniline and quinoline to esterity said natural penicillin;

adding to the mixture containing esterified penicillin phosphorous pentachloride to transform the esterified penicillin into the corresponding iminochloride;

adding to the mixture containing the iminochloride a primary alcohol selected from the group consisting of methyl alcohol and butyl alcohol to transform the iminochloride into an imidate;

adding acetone to the mixture containing the imidate;

reacting the imidate in the mixture at a temperature range from −50°C to −15°C simultaneously with water and acid chloride of phenylclycine hydrochloride at a pH between 1 and 2;

adding a large excess of water to hydrolyze the ester; and adding a base selected from the group consisting of sodium hydroxide and ammonia to the aqueous portion of the mixture to obtain a pH in the range of 4-5 to precipitate D(−)-a-aminobenzylpenicillin as trihydrate.

3. The method as claimed in claim 1 wherein said step of adding acetone is done simultaneously with said step of reacting the imidate.

* * * * *